United States Patent

[11] 3,581,047

| [72] | Inventor | James W. Mitchell, Jr. |
| --- | --- | --- |
| | | Detroit, Mich. |
| [21] | Appl. No. | 824,635 |
| [22] | Filed | May 14, 1969 |
| [45] | Patented | May 25, 1971 |
| [73] | Assignee | Ford Motor Company |
| | | Dearborn, Mich. |

[54] SPOT WELDING PROCESS
2 Claims, 2 Drawing Figs.

[52] U.S. Cl. ................................................. 219/91, 219/119
[51] Int. Cl. .................................................. B23k 11/30
[50] Field of Search ........................................ 219/91, 105, 107, 117, 119; 280/106; 296/7.8

[56] References Cited
UNITED STATES PATENTS

| RE18,750 | 2/1933 | Tarbox ........................ | 219/117X |
| 3,108,836 | 10/1963 | Deckert ....................... | 280/106X |

Primary Examiner—J. V. Truhe
Assistant Examiner—J. G. Smith
Attorneys—John R. Faulkner and Thomas H. Oster ABSTRACT: A process for the production of a hollow, stiff, noncircular fabricated steel structural member in which the assembly is accomplished by spot welding. The critical spot weld in this assembly is accomplished by causing the welding current to flow along a sheet metal member then through the sheet metal member and supporting the sheet metal member along which the current flows against columnar collapse by contact with a complementary surface of a welding electrode.

PATENTED MAY 25 1971 3,581,047

INVENTOR
JAMES W. MITCHELL JR.
BY John R. Faulkner
Thomas H. Oster
ATTORNEYS

3,581,047

SPOT WELDING PROCESS

THE INVENTION

This invention teaches the production of vehicular body pillars which are stiff, light and readily fabricated by a combination of sheet metal bending and spot welding. Both of these techniques have been developed to a high degree in the vehicular industry. The result is a very economical body member.

It is inherent in the design of this member that a spot weld be made with one of the members of the weld being loaded in a columnar fashion. It has been found to be necessary to support this member during the welding operation by an appropriately formed spot welding electrode.

Figure 1:
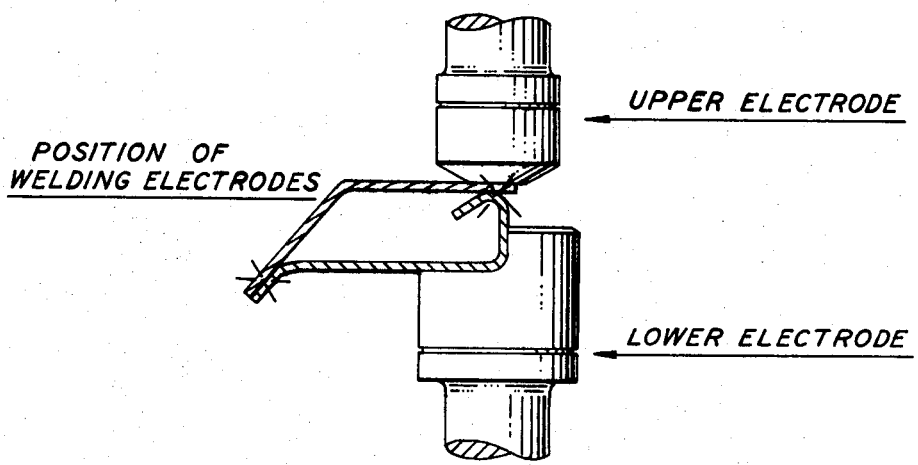
Figure 2:
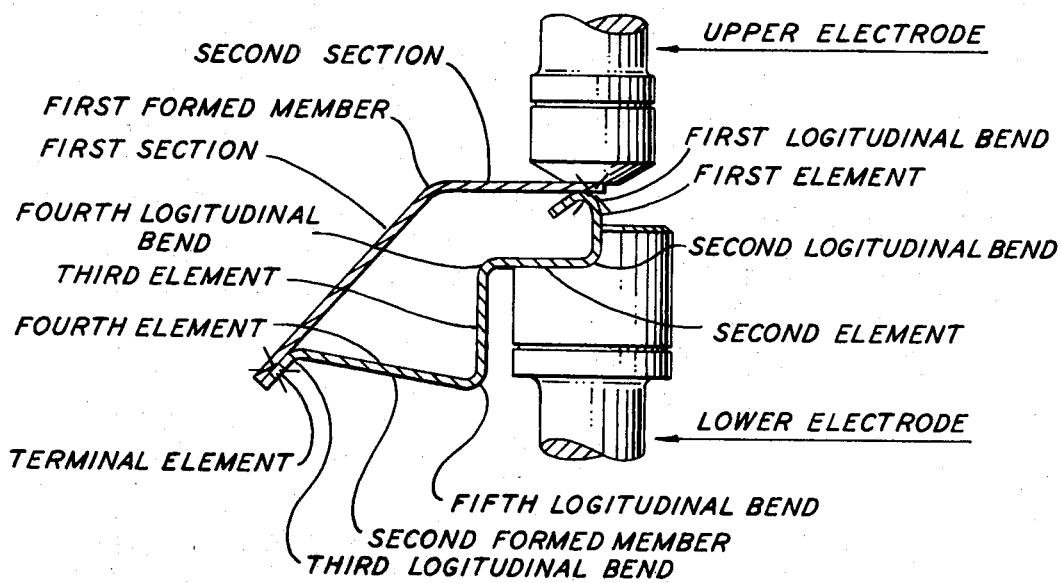

This invention has been shown in two forms one of which is shown in section in FIG. 1 and the other in FIG. 2. FIG. 2 represents the preferred embodiment. Each of these Figures of drawing represents a section of the pillar with the electrodes employed to make one of the spot welds shown in position to make the weld and to provide columnar support to one of the members being welded. Since the structure shown in FIG. 2 is the preferred structure, the invention will be explained in detail with reference to this portion of the drawing.

This structure is fabricated from mild steel flat stock having a thickness of 0.060 inch. The pillar was formed from two lengths of this flat steel stock 30 inches long. One of these strips was formed into a first formed member by providing it with a longitudinal bend intermediate its ends. This bend divides the first formed member longitudinally into a first section and a second section. This completes the first formed member.

The final pillar is formed by welding this first formed member to a second formed member. The construction of the second formed member will now be described with reference to FIG. 2 of the drawing.

This second formed member is provided with a first longitudinal bend in which a narrow end section of the flat stock is bent through an angle substantially in excess of 90°. This bend is such that it includes an angle of about 45°, although the exact angle is not critical. The portion of the stock adjacent this first longitudinal bend has been nominated the first element. This first element terminates in a second longitudinal bend. This bend is at approximately 90° and divides the second formed member into a first element and a second element.

This second element in turn terminates in a fourth longitudinal bend which divides the second formed element into a second element and a third element. This bend is also about 90° and locates the third element and the first element approximately parallel. Similarly, the third element terminates in a fifth longitudinal bend which is also approximately a right angle. This fifth longitudinal bend divides the second formed member into a third element and a fourth element.

The fourth element of the second formed member terminates in a third longitudinal bend which makes an angle greater than 90° between the fourth element of the second formed member and the terminal element of the second formed member. This angle is chosen so that upon assembly of the first formed member and the second formed member the terminal element of the second formed member is parallel to the first section of the first formed member. As indicated in the drawings, the terminal member of the second formed member and the first section of the first formed member are joined by conventional spot welding techniques.

The completion of the pillar section requires that the first longitudinal bend of the second formed member be spot welded to the second formed section of the first formed member. This weld is made with an electrode force of 625 pounds, with a weld time of 12 cycles and a secondary current varying between 14,500 and 18,000 amperes. This heavy electrode force and the heat generated in the first element of the second formed member requires that this first element be supported against columnar collapse to the right as shown in the drawings. This is accomplished by forming the working face of the lower electrode complementary to the adjacent regions of the second formed member as clearly shown in the drawing. This shape of electrode effectively prevented columnar collapse of the first element to the right during the welding operation and produced welds which regularly yielded buttons 0.22 inch wide then pulled to destruction.

The structure shown in FIG. 1 is a simplified version of that shown in FIG. 2. The structure shown in FIG. 1 is essentially that shown in FIG. 2 with the sole exception of the deletion of the third element and the fourth element.

I claim as my invention:

1. The process of producing a hollow, stiff, noncircular fabricated steel structural member in which fit-up problems are minimized comprising providing a first formed member and a second formed member, said first formed member being formed from flat steel stock by providing in said flat steel stock a longitudinal bend which bend divides the first formed member into a first section and a second section which first section and second section make an angle of more than 90° with each other, said second formed member being provided with a first longitudinal bend in which a narrow edge section of flat stock is bent through an angle substantially in excess of 90°, said flat steel stock being provided with a second longitudinal bend adjacent said first bend, said second longitudinal bend dividing the second formed member into a first element and a second element arranged at approximately 90° with each other, said second formed member being provided with a third longitudinal bend arranged to produce a terminal element of the second formed member which when assembled with the first formed member to produce the fabricated structural member will be parallel to the first section of the first formed member, assembling the first formed member and second formed member to form the fabricated structural member, spot welding the two formed members together by causing a heavy welding current to flow in series along the first element, through the first element at the second longitudinal bend and then through the first longitudinal bend to the second section and supporting the portion of the first element along which the welding current flows against columnar collapse by contact with a complementary section of the spot welding electrode.

2. The process of claim 1 in which the second element and the terminal element of the second formed member are united through a third element and a fourth element, the third element being approximately parallel to the first element and the fourth element being approximately parallel to the second element.